Sept. 22, 1964
J. H. AMMON
3,150,051
PACKAGED NUCLEAR PLANT WITH INTEGRAL
SUPERHEATER AND PRESSURIZER
Filed Aug. 16, 1962
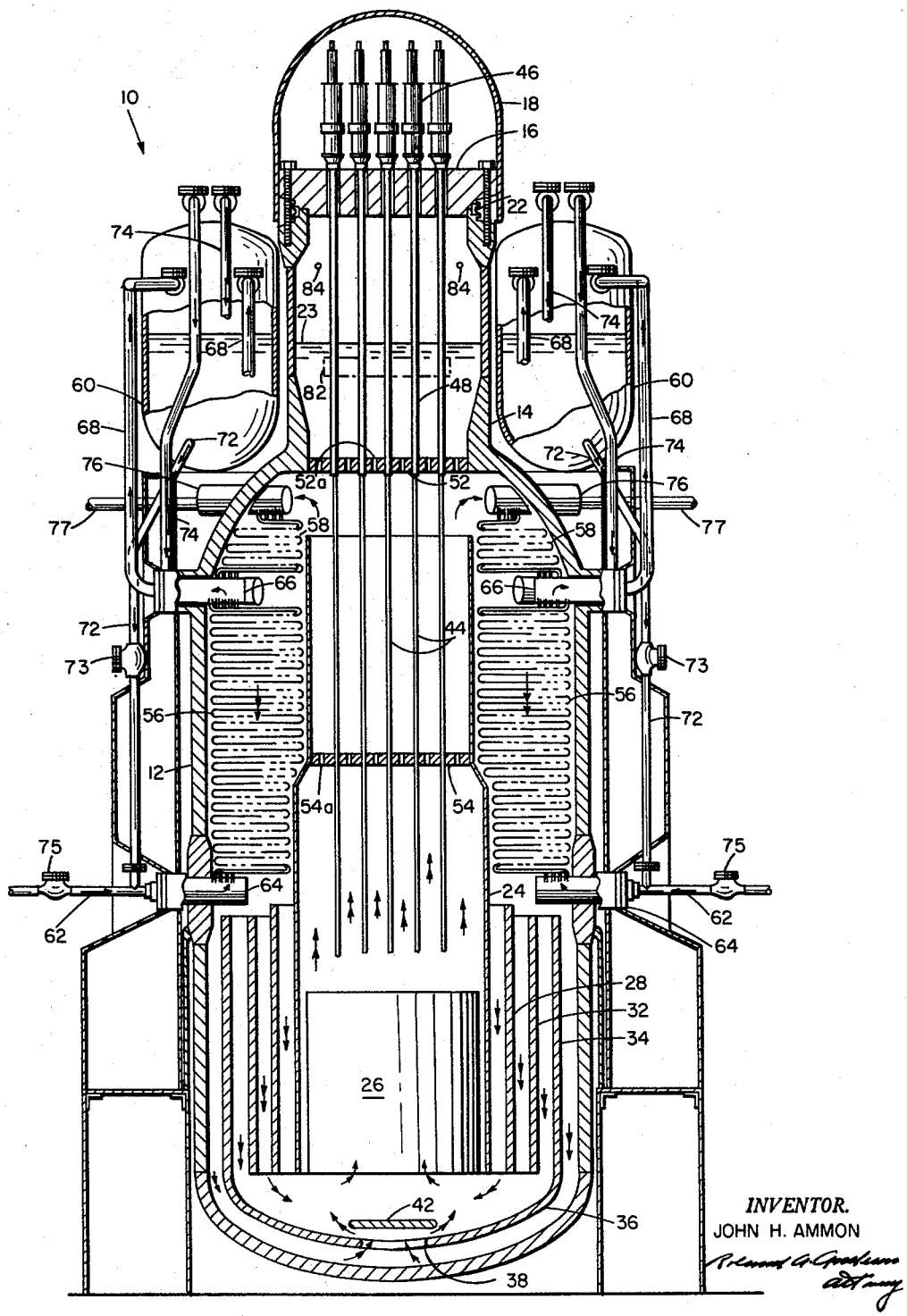
INVENTOR.
JOHN H. AMMON

United States Patent Office 3,150,051
Patented Sept. 22, 1964

3,150,051
PACKAGED NUCLEAR PLANT WITH INTEGRAL
SUPERHEATER AND PRESSURIZER
John H. Ammon, Akron, Ohio, assignor to the United
States of America as represented by the United States
Atomic Energy Commission
Filed Aug. 16, 1962, Ser. No. 217,786
8 Claims. (Cl. 176—53)

The present invention relates to a nuclear reactor with integral superheater and pressurizer and more particularly to a self-pressurized water nuclear reactor in which steam generation apparatus including superheater are incorporated within the pressure vessel itself.

Previous nuclear reactors of the pressurized water type designed for ship propulsion generally utilize the primary water as a heat source and exterior heat exchange apparatus for the steam generation, as in the "Merchant Marine Ship Reactor," covered by U.S. Patent No. 2,982,713 issued to Sankovich et al. While arrangements of the type shown therein have proved to be satisfactory, such reactors with their accessory equipment occupy large amounts of space which is extremely valuable in a ship, as well understood in the art. Reductions in volume of space occupied by the reactor power plant equipment would also permit substantial weight reductions due to reduced piping and similar requirements, as well as a more efficient utilization of shielding due to a more compact unit to be shielded.

Many attempts have been made to combine the nuclear reactor with the steam generation equipment. The present arrangement, offering adventages of compactness, efficiency, and ease of control is one in which a pressurized water reactor is utilized with steam generation equipment immersed in the primary water of the pressure vessel itself. This invention offers a novel and improved construction in which superheated steam is produced within the reactor. The latter is provided with an arrangement for stabilizing the reactor under varying steam load conditions. Natural circulation of the primary water and an internal construction are designed to maintain pressurization of the primary vessel.

It is therefore a first object of this invention to provide an integral nuclear plant for the generation of superheated steam.

It is a further object to provide nuclear steam generation apparatus in which steam generation equipment is incorporated into a pressurized water reactor.

Another object of this invention is to provide a pressurized water nuclear reactor with natural circulation of the primary water incorporating steam generation and superheater equipment.

Still another object of this invention is a natural circulation pressurized water reactor incorporating superheater apparatus and an internal arrangement for maintaining pressurization of the primary water.

Other objects and advantages of this invention will hereinafter become more evident from the following description taken with reference to the accompanying drawing in which is shown an elevation view in section partially schematized of a preferred embodiment of this invention.

Shown in the accompanying figure is a reactor 10 consisting of a cylindrical pressure vessel 12 closed at the bottom and sealed at the top by a pressurizer 14, a cylindrical cap 16, and a hood 18. A seal 22 between cap 16 and pressurizer 14 seals the interior of pressure vessel 12 which is filled with primary light water moderator and coolant up to a level 23.

Within pressure vessel 12, a cylindrical chimney 24, open at both ends, extends vertically along the vertical axis of vessel 12. The top and bottom ends of chimney 24 are spaced from the top and bottom of vessel 12, respectively. Within chimney 24 and occupying the bottom portion thereof is core 26 which is cylindrical in shape and is the nuclear or active portion of reactor 10. Core 26 contains fissionable fuel elements assembled into a critical mass as is now well understood in the art. A suitable nuclear core would be one of the type shown in Sankovich et al., identified above, provided the grid plates at the bottom and top of the core are modified to permit flow of the coolant through all of the fuel elements in the manner illustrated. Other suitable arrangements of fuel or types of fuel may of course be utilized as the state of the art currently will permit.

Surrounding chimney 24 in the area of core 26 a plurality of cylindrical thermal shields 28, 32 and 34, are suitably mounted with the last-named shield terminating in a curved lower portion 36 having a central opening 38 and a baffle plate 42 immediately above to cause a more uniform distribution of the primary fluid entering core 26, and also to provide a radiation shield to protect the bottom head of pressure vessel 12 which otherwse would be exposed to radiation through opening 38. Core 26 is provided, as in the Sankovich et al. patent, with fuel elements having vertical passageways to permit the primary fluid to flow upwardly therethrough.

For nuclear control of reactor 10, there are provided a plurality of control rods 44 which are supported and driven by control rod mechanisms 46 mounted on cap 16 within hood 18. Rods 44 extend down through control rod tubes 48 and guide plates 52 and 54, which are provided with openings 52a and 54a, respectively, to permit circulation of the primary fluid therethrough. As is well understood in the art, core 26 is provided with slots (not shown) to accommodate control rods 44 which are moved up and down in core 26 to control the rate of nuclear fission.

For the generation of steam within reactor 10 there are provided within vessel 12 in the annular space surrounding chimney 24 above thermal shields 28, 32 and 34, a steam generator consisting of several boiler sections 56 and superheat sections 58. The steam generation equipment is shown schematically and in phantom as the details thereof may be selected as desired in accordance with established boiler standards.

Surrounding pressurizer 14 of reactor 10, a plurality of sealed stabilizing drums 60 are situated for a purpose to be later described. Feedwater inlet to boiler sections 56 is through pipes 62 and headers 64. The steam leaving boiler sections 56 does so through headers 66 and pipes 68 entering drums 60 in the upper portions thereof. Within stabilizing drums 60, the wet steam from boiler sections 56 separates into water and dry steam. The water accumulating in the bottom of drums 60 returns by way of pipes (not shown) to the usual feedwater tank (not shown) or deaerator (not shown) with flow controlled by an automatic operated blowdown valve (not shown). Pipes 72 from drums 60 pass back to feedwater pipes 62 and are controlled by normally closed valves 73 designed to permit emergency cooling of core 26 in case of dead ship with no pumps.

The steam within drums 60 is passed through pipes 74 into headers (not shown) and then the superheater sections 58. The superheated steam leaves sections 58 into headers 76 and then by pipes 77 leaves reactor 10 for use in generating power. Check valves 75 in feedwater inlet pipes 62 are used to isolate selected portions of the steam generator which as is understood would be made in sections to isolate any portion becoming defective in operation.

With pressurizer 14, are located, as shown in phantom, electrical heaters 82 immersed in the primary water just below level 23 and water spray nozzle openings 84 in the side wall for a purpose to be later described.

In the operation of reactor 10, the primary water is heated in core 26 by the heat generated as a result of the nuclear fission chain reaction which takes place, this reaction being controlled as is understood in the art by movement of the control rods 44. The primary water then circulates in the manner indicated by the double-headed arrows, up through chimney 24 and down through superheater sections 58 and boiler sections 56.

Steam is generated in sections 56 from feedwater entering from headers 64. Stabilizing drums 60 receive the wet steam from sections 56 and separate the water and steam to return the former to the feedwater tanks (not shown) and transfer the steam for superheating in sections 58 by way of pipes 74. The steam entering drums 60 is nearly dry. The moisture still in the steam would be separated by simple baffling inside drums 60. The water is accumulated there for use during load swings as described below.

Stabilizing drums 60 perform very important functions in reactor 10. In addition to separating the water and dry steam as described and thus guaranteeing dry steam to superheater sections 58, they will also act as a steam reservoir in case of sudden load swings, i.e., it will evaporate water to increase steam flow due to sudden drop of pressure in the steam line to the turbine or other point of steam use. In case of a dead ship with all pumps not functioning, drums 60 will cause circulation of the water by way of tubes 72 to and through the boiler tubes sections for removal of the decay heat in core 26. Furthermore, drums 60 provide the means for flushing tubes and blowing down boiler water without affecting the load.

In order to regulate the water level in the stabilizing drums 60 to prevent the level from going too high a conventional "three-element" feedwater control system may be used. By such an arrangement a blowdown valve (not shown) from drums 60 and direct control of the feedwater valves and steam outlet valves (not shown) the water levels in drums 60 would be kept within desired ranges.

The boiler tubes making up sections 56 and 58 may be of the continuous loop type and divided into bundles which can be individually isolated by the externally located stop valves 75 in case of tube failures.

Pressurizer 14 forms a volume above guide plate 52 in which a steam space (above the water level 23) is maintained in equilibrium with the water by alternate use of electrical heaters or spray cooling from nozzle openings 84 as the transients of the system demand. The water level in the pressurizer is maintained within the allowable fluctuation limits by regulating the rate of primary water out to the purification system and varying the amount of water returned by the charge pump (not shown) as it understood in the art. In order to create steam in the steam space at start-up or during operation of reactor 10 the electric heaters 82 are utilized.

Design data for a particular reactor of the type just described is given in the following table:

Table

| | | |
|---|---|---|
| Power output | MWT | 69 |
| Steam flow | lb./hr. | 240,000 |
| Primary design pressure | p.s.i.g. | 1200 |
| Primary design temperature | ° F. | 600 |
| Secondary design pressure | p.s.i.g. | 700 |
| Superheat steam out | ° F. at 350 p.s.i.g. | 530 |
| Feedwater in | ° F. at full load | 347 |
| Primary flow | lb./hr. at full load | $3.0 \times 10^6$ |
| Number of tubes | | 304 |
| Tube size | min. wall | $1'' \times .135$ |
| Pressurizer volume | ft.$^3$ | 201 |
| Two stabilizing drums | I.D. | 48'' |
| Primary temperature leaving core | ° F. | 550 |
| Primary temperature entering core | ° F. | 485 |
| Overall height of reactor | ft. | 38 |

While only a preferred embodiment of this invention has been described and illustrated, it is understood that many variations thereof may be made without departing from the principles of this invention as defined by the appended claims.

I claim:

1. A nuclear steam generator comprising a pressure vessel substantially filled with primary light water moderator coolant and forming a pressurizer steam space above the level of said coolant, a cylindrical chimney open at both ends mounted within said vessel spaced at the top and bottom from said vessel and forming an annular space therewith, reactive core means having vertical passageways for coolant mounted within the lower portion of said chimney, said primary water flowing in natural circulation up through said chimney and down through said annular space surrounding said chimney, boiler means located in said annular space for absorbing heat from said primary water for producing steam, said boiler means including means for producing saturated steam and means for producing superheated steam, the latter said means being disposed above the former said means to receive first the naturally circulating heated primary coolant, means for delivering feedwater to said boiler means, and means for withdrawing from said generator superheated steam produced in said boiler means.

2. The nuclear steam generator of claim 1 in which a plurality of thermal shields are located in said annular space surrounding said core and said boiler means is located above said core means, at least one of said thermal shields extending to the space below said chimney, the latter said shield including means for permitting flow of said coolant up into said chimney.

3. The nuclear steam generator of claim 1 in which means external to said vessel are provided to receive the saturated steam produced by said boiler means, separate out the water therein and return the remaining dry saturated steam to said means for producing the superheated steam.

4. A nuclear steam generator comprising a pressure vessel substantially filled with primary light water moderator coolant and forming a pressurizer steam space above the level of said coolant, a cylindrical chimney open at both ends mounted within said vessel spaced at the top and bottom from said vessel and forming an annular space therewith, reactive core means having vertical passageways for coolant mounted within the lower portion of said chimney, said primary water flowing in natural circulation up through said chimney and down through said annular space surrounding said chimney, boiler means located in said annular space above the top of said core means for absorbing heat from said primary water for producing steam, means for delivering feedwater to said boiler means, superheater means located in said annular space above said boiler means for absorbing heat from said primary water for producing superheated steam, stabilizing means external to said vessel for receiving steam from said boiler means, said stabilizing means separating water from dry steam and delivering said dry steam to said superheater means, and means for transferring the water in said stabilizing means back for use as feedwater to said boiler means.

5. The nuclear steam generator of claim 4 in which control rods extend down through said chimney for movement through said core for controlling the operation of said core.

6. The nuclear steam generator of claim 5 in which said pressurizer steam space includes means for producing and maintaining said primary coolant at a preselected pressure.

7. The nuclear steam generator of claim 6 in which said boiler means is divided into sections and means are provided in said feedwater delivering means for isolating any desired sections in said boiler means.

8. The nuclear steam generator of claim 6 in which said stabilizer means additionally acts as a steam reservoir to stabilize the output steam pressure of said nuclear steam generator.

References Cited in the file of this patent

UNITED STATES PATENTS

| | | |
|---|---|---|
| 1,993,747 | Novac | Mar. 12, 1935 |
| 2,982,713 | Sankovich et al. | May 2, 1961 |
| 2,998,367 | Untermyer | Aug. 29, 1961 |

FOREIGN PATENTS

| | | |
|---|---|---|
| 835,266 | Great Britain | May 18, 1960 |